US012656615B2

(12) United States Patent
Yao et al.

(10) Patent No.: US 12,656,615 B2
(45) Date of Patent: Jun. 16, 2026

(54) OPTICAL LENS GROUP FOR AUGMENTED REALITY DISPLAY AND VIRTUAL IMAGING DEVICE USING SAME, AND NEAR-EYE DISPLAY

(71) Applicant: Beijing NED+AR Display Technology Co., Ltd., Beijing (CN)

(72) Inventors: Cheng Yao, Beijing (CN); Qiwei Wang, Beijing (CN); He Wang, Beijing (CN); Danyang Li, Beijing (CN); Yang Li, Beijing (CN)

(73) Assignee: Beijing NED+AR Display Technology Co., Ltd., Beijing (CN)

( * ) Notice: Subject to any disclaimer, the term of this patent is extended or adjusted under 35 U.S.C. 154(b) by 377 days.

(21) Appl. No.: 18/536,163

(22) Filed: Dec. 11, 2023

(65) Prior Publication Data

US 2024/0192499 A1     Jun. 13, 2024

(30) Foreign Application Priority Data

Dec. 13, 2022     (CN) .......................... 202211600715.1

(51) Int. Cl.
G02B 27/01          (2006.01)

(52) U.S. Cl.
CPC .. G02B 27/0172 (2013.01); G02B 2027/0178 (2013.01)

(58) Field of Classification Search
CPC ............ G02B 27/0172; G02B 27/0101; G02B 27/01; G02B 2027/0179; G02B 27/0081; G02B 17/0848
See application file for complete search history.

(56) References Cited

U.S. PATENT DOCUMENTS

| | | | | |
|---|---|---|---|---|
| 2018/0067320 A1* | 3/2018 | Komatsu | ................ | G02B 13/18 |
| 2018/0143440 A1* | 5/2018 | Cheng | ................ | H04N 13/346 |
| 2019/0278087 A1* | 9/2019 | Cheng | ................ | G02B 27/0172 |
| 2021/0333557 A1* | 10/2021 | Qin | ........................... | G02B 5/04 |

* cited by examiner

*Primary Examiner* — Jonathan Y Jung
(74) *Attorney, Agent, or Firm* — SYNCODA LLC; Feng Ma

(57)          ABSTRACT

An optical lens group for augmented reality (AR) near-eye display includes a primary lens and an auxiliary lens. An image presented by a microdisplay is enlarged by the optical lens group to form a virtual image which can be observed by an eye of a user. A shape of an outermost surface of the optical lens group can be changed to meet requirements of different diopters. The optical lens group has a primary lens mainly used for image information transmission and image enlargement and an auxiliary lens close to at least one surface of the primary lens. The auxiliary lens is arranged on a lower side or an outer side of the primary lens without propagating any image light signal from a micro image display.

12 Claims, 4 Drawing Sheets

OPTICAL LENS GROUP FOR AUGMENTED REALITY DISPLAY AND VIRTUAL IMAGING DEVICE USING SAME, AND NEAR-EYE DISPLAY

CROSS-REFERENCE TO RELATED APPLICATION

The present disclosure claims priority to Chinese Pat. Appl. No. 202211600715.1 filed on Dec. 13, 2022, the disclosure of which is hereby incorporated by reference in its entirety.

BACKGROUND

Since the concept of AR was proposed, near-eye image display devices based on an AR mode have developed into a plurality of directions and product realization routes. Distinguished from optical transmittance, modes for realizing AR are optical see-through and video see-through.

SUMMARY

The present disclosure relates to an optical lens group for augmented reality (AR) display and a virtual image display device using same, and a near-eye display. The optical lens group for AR display has an appearance and a size similar to those of ordinary corrective lenses and has good optical performance to meet requirements for AR display, and it can be fixed in a specific way to make it look the same as the front of ordinary glasses when being worn.

Various embodiments of the present disclosure provide a relatively thin and stable optical lens group with a curved surface for AR display, and micro display elements are added to form a virtual imaging device, which can then serve as a near-eye display to achieve near-eye display of AR in an optical see-through manner.

An optical lens group for AR display according to the present disclosure includes a primary lens (10) and an auxiliary lens (20), the auxiliary lens at least adjacent to one surface of the primary lens. The primary lens includes a first optical surface for receiving image light. The image light undergoes at least one total reflection and one reflection depending on a transmission-reflection split ratio in the primary lens after entering the primary lens through the first optical surface, and then is transmitted out of the primary lens and reaches an exit pupil position. A tilt angle θ of a normal line at a vertex position of an optical surface of the primary lens facing the exit pupil position with respect to a normal line of an exit pupil plane satisfies 0°<θ<10°, and only the primary lens determines a field of view of the image light received by the lens group with respect to a human eye at the exit pupil position. The auxiliary lens is disposed at least adjacent to an optical surface of the primary lens away from the first optical surface, which opposite to the first surface. A surface of the auxiliary lens facing a real-world (e.g., environment or ambient) side extends from a surface of the primary lens away from the first optical surface to be in continuity with a second optical surface of the primary lens, or extends from a surface of the primary lens away from the first optical surface to a direction of a second optical surface of the primary lens to partially cover the second optical surface.

The primary lens includes at least four effective optical surfaces: a first optical surface, a second optical surface, a third optical surface, and a fourth optical surface. The image light received by the first optical surface enters the primary lens and propagates to the direction of the second optical surface, undergoes a first light reflection on the second optical surface and propagates to a direction of the third optical surface, undergoes total reflection after reaching the third optical surface and then propagates to a direction of the fourth optical surface, undergoes a second reflection after reaching the fourth optical surface and returns and propagates towards the third optical surface, and finally reaches the exit pupil position of the primary lens after exiting from the third optical surface.

The second optical surface and the third optical surface of the primary lens are disposed on different sides. The fourth optical surface is the optical surface away from the first optical surface and is used for connecting the second and third optical surfaces. Each optical surface of the primary lens is constructed to satisfy a total reflection condition when the image light first reaches the third optical surface.

Preferably, the second optical surface and/or the fourth optical surface of the primary lens are free-form surface, and the third optical surface is selected from spherical or aspheric.

In an implementation, the primary lens is constructed to satisfy a condition that the reflection of the image light by the second optical surface is total reflection when the image light reaches the second optical surface. The auxiliary lens is constructed in such a manner that the auxiliary lens extends from near a position connecting the second optical surface and the fourth optical surface to the direction of the second optical surface until when the auxiliary lens partially covers the second optical surface, there is an air gap between the auxiliary lens and the second optical surface, and a length of a linear distance from the top of the auxiliary lens to the bottom of the auxiliary lens exceeds 25 mm, and only an uppermost edge to a lowermost edge of the auxiliary lens determines a field of view of real-world light received through the lens group with respect to the human eye at the exit pupil position.

The present disclosure further includes a virtual imaging device using the foregoing optical lens group for AR near-eye display. The virtual imaging device further includes a micro-display panel as an image source, and the micro-display panel is fixed near the first optical surface by a frame.

The optical lens group fixed by the frame has a total thickness of less than 12 mm on a visual axis along a center of an exit pupil, and reaches a field of view of not less than 360.

Preferably, an optical surface of the optical lens group facing the exit pupil and an optical surface away from the exit pupil and facing the real-world side are caused to have the same surface shape or have different surface shapes to reach a user's given diopter.

A near-eye display constructed according to the virtual imaging device of the present disclosure is in a form of eyeglasses, and includes the virtual imaging device placed in a lens position in a body of the eyeglasses, and a main board and a battery placed in a leg of the eyeglasses.

The lens group of the present disclosure can achieve a relatively thin and curved appearance and can implement an ordinary vision correction function. Therefore, it is conducive to form a simulated glasses-like near-eye display appearance and provide feasibility of a high degree of customization, thereby making image fusion more accurate, and wearing more fashionable and user-friendly. The circuit board and battery in the leg provide necessary control and power for the image source.

DETAILED DESCRIPTION

Figure 1:
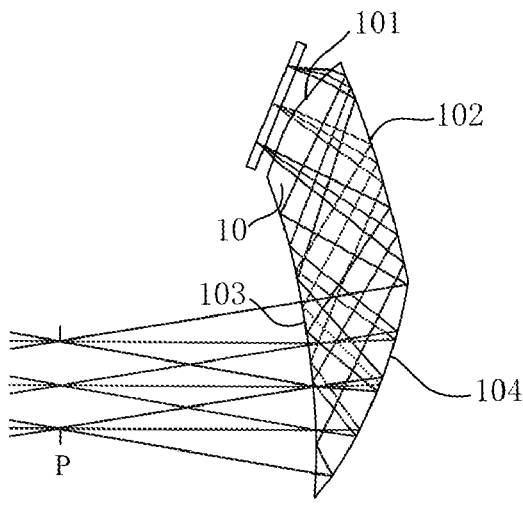
FIG. 1 is a cross-sectional view of a primary lens of an optical lens group for AR display according to the present disclosure.

Exemplary embodiments of the present disclosure are described in detail below to explain the present disclosure. Those skilled in the art should understand that the specific names, terms, and positional relationships used in the following descriptions are only used as relative descriptions and are not used as absolute restrictions on the actual preceding or following, and do not constitute limitations on the technical solution of the present disclosure. In addition, in the following descriptions, for convenience of description, the same components will be given the same reference numerals.

In the following embodiments, expressions such as "first" and "second" may modify various constituent elements of the present disclosure, but do not limit the corresponding constituent elements. For example, the expressions do not limit the order or importance of the corresponding constituent elements. Instead, the expressions may be used to distinguish one constituent element from another. For example, a first constituent element may also be named a second constituent element without departing from the spirit and scope of the present disclosure. Likewise, even a second constituent element may be named a first constituent element.

The inventors of the present disclosure have recognized that optical see-through AR can be implemented relying on a specific near-eye display optical solution.

To achieve both a compact structure and see-through display, light of a virtual image usually needs to propagate in the form of total reflection inside an optical element and be integrated with a real-world see-through light path at a near-eye position. As near-eye displays need to be worn on a head portion of a person, their lightness, small size, and good display effect are especially important. The design of an optical system in a near-eye display device directly affects the size and weight of a head-mounted device. In some implementations, there are near-eye optical systems that use free-form prisms to enlarge microdisplay images. To meet the needs of large exit pupil diameter and large exit pupil distance for near-eye display, the thickness of a near-eye display in the visual axis direction usually needs to be at least greater than 14 mm. Therefore, most existing free-form prism solutions are difficult to achieve a shape close to the appearance features of ordinary myopia corrective glasses. The Birdbath solution based on coaxial optical paths also has similar disadvantages.

Restricted by the performance of size, brightness, and color of display image source, optical see-through AR near-eye displays have always pursued balancing between display effects and device sizes. An optical system with curvature is relatively thick as a whole, and it is difficult to simulate the appearance of ordinary myopia corrective glasses products, causing users to have concerns about wearing them. While, a completely flat waveguide AR optical components cannot provide visual correction performance based on physical principles. In addition, although a waveguide can have a thin and light structure, so far, a waveguide display system still requires a relatively complex projection system. This also affects its capability to achieve truly complete, thin, light, and comfortable performance.

Primary Lens

An optical lens group for AR display according to the present disclosure includes a primary lens shown in FIG. 1 and an auxiliary lens for cooperating to achieve optically transmissive display. The primary lens 10 is used for projecting an image from an image display to a user. The image is also used as an enhanced image, different from a natural image seen by the user from an environment. In addition to contributing to image light projected to the user, image light emitted by the image display is also partially lost and transmitted through the primary lens. That is, the image light contributed to projecting the image to the user only propagates in the primary lens.

The primary lens shown in FIG. 1 mainly includes at least four effective optical surfaces in a curved-surface state: a first optical surface 101, a second optical surface 102, a third optical surface 103, and a fourth optical surface 104. The first optical surface faces, for example, an image source side implemented by a micro-display panel 30. The second and fourth optical surfaces are close to a natural environment side. The third optical surface is close to a human eye side. Each surface can be any one of a spherical surface, an aspherical surface, or a free-form surface. The primary lens 10 uses the first optical surface 101 thereof as an incident surface to receive image light from the micro-display panel 30 to be transmitted into the primary lens 10 and to propagate to a direction of the second optical surface 102 thereof. The image light reaches the second optical surface 102, undergoes total or partial reflection, and propagates to a direction of the third optical surface. Subsequently, when reaching the third optical surface, the image light is totally reflected by the third optical surface 103 to propagate to a direction of the fourth optical surface. When reaching the fourth optical surface 104, the image light is partially reflected on the fourth optical surface 104 to return and propagate to the direction of the third optical surface. When reaching the third optical surface again, the image light is transmitted through the primary lens 10 and reaches an exit pupil position P. The primary lens 10 can be preferably made of an optical glass material, an optical resin material, or other optical materials according to requirements of actual processing technologies and performance requirements. A refractive index of the material of the primary lens 10 is greater than 1. An incident angle of the image light when it first reaches the third optical surface 103 of the primary lens satisfies a total reflection condition. That is, the incident angle of the image light when it is first directed from the second optical surface 102 to the third optical surface 103 is greater than a critical angle of total reflection of the material used in the primary lens 10, so that the total reflection condition is satisfied when the image light first reaches the third optical surface 103. In terms of the fourth optical surface, because the total reflection condition is definitely not satisfied, the fourth optical surface should be coated with a spectroscopic film with a preset split ratio to achieve reflection, and its reflectivity preferably ranges from 20% to 80%. On the second optical surface, reflection can be performed selectively in a manner satisfying total reflection or similar to coating on the fourth optical surface. Due to a position of the second optical surface and a final brightness requirement of the exit pupil position P, the second optical surface and the fourth optical surface that do not achieve total reflection may have different split ratios. However, for consistency in appearance, the second optical surface and the fourth optical surface may also be coated with spectroscopic films with the same split ratio.

The primary lens 10 serves as a primary optical element for imaging (enlarging a virtual image) of the micro-display panel 30. Curvature of each optical surface of the primary lens 10 and an intermediate propagation medium are utilized to provide a predetermined optical power, to enlarge an image displayed on the micro-display panel 30, so that the image light of the micro-display panel is amplified and projected far away through the primary lens 10. The image from the micro-display panel seen by the human eye at the exit pupil position P appears to be emitted from a few meters away from the eye rather than from a very close place (where the micro-display panel is actually located). In view of this, those skilled in the art may understand that, the primary lens 10 may be independently used for VR-type near-eye display. In this case, the second optical surface 102 and the fourth optical surface 104 should be covered by a total reflective film. When a field of view with respect to the human eye does not exceed 38°, a thickness of the primary lens is reduced to less than 8 mm.

Specific parameters of the primary lens 10 according to the present disclosure may be shown in the following table. The main design parameters are described by using an example in which the first optical surface 101, the second optical surface 102, and the fourth optical surface 104 are free-form surfaces, and the third optical surface 103 is aspheric. The exit pupil position P of the human eye is used as an origin, a direction of a visual axis is used as a Z-axis, an upward direction perpendicular to the Z-axis direction is used as a Y-axis, and a direction perpendicular to a Y-Z plane is used as an X-axis, to establish a coordinate system. Table 1 shows surface shape parameters of the optical surfaces. Table 2 shows coefficients for a plurality of surfaces with surface shapes being free-form surfaces. The primary lens of this data example has a diagonal field of view of about 40 degrees with respect to the human eye and a lens thickness of about 9.5 mm. An eye box is an ellipse of 10 mm*6 mm.

TABLE 1

Optical surface parameters of primary lens
and auxiliary lens in some embodiments

| Surface marking | Surface shape | Radius | Y global coordinate | Z global coordinate | Alpha tilt |
|---|---|---|---|---|---|
| 101 | XY polynomial | 1.05 | 19.31 | 16.80 | −26.32 |
| 102 | XY polynomial | −52.71 | 18.28 | 22.84 | 18.97 |
| 103 | Aspheric | 90.9 | 2.20 | 18.67 | 8.34 |
| 104 | XY polynomial | −5.79 | −4.89 | 21.62 | −28.94 |
| display | Spheric | Infinite | 20.72 | 15.72 | −22.16 |

6

TABLE 2

Coefficients in a surface shape equation for free-form surfaces

| | Parameter item | Surface 101 | Surface 102 | Surface 104 |
|---|---|---|---|---|
| | K | −1.03 | 1.69 | −0.98 |
| C4 | $X^2$ | −0.40 | 6.7e−03 | 7.36e−02 |
| C6 | $Y^2$ | −0.41 | 2.2e−03 | 6.94e−02 |
| C8 | $X^2Y$ | −1.2e−03 | −5.0e−04 | 3.0e−04 |
| C10 | $Y^3$ | 1.4e−03 | −4.0e−04 | 9.0e−04 |
| C11 | $X^4$ | 1.8e−03 | 1.89e−05 | 4.80e−06 |
| C13 | $X^2Y^2$ | 2.8e−03 | −2.86e−05 | −7.67e−06 |
| C15 | $Y^4$ | 5.0e−04 | −1.60e−05 | −8.44e−05 |
| C17 | $X^4Y$ | 1.11e−05 | 1.81e−06 | −1.59e−06 |
| C19 | $X^2Y^3$ | 7.58e−05 | −2.47e−06 | −1.24e−06 |
| C21 | $Y^5$ | 3.20e−05 | 2.60e−06 | 4.58e−06 |
| C22 | $X^6$ | −1.03e−05 | −1.38e−07 | 3.51e−08 |
| C24 | $X^4Y^2$ | −2.89e−05 | −2.96e−08 | 3.02e−07 |
| C26 | $X^2Y^4$ | −3.25e−05 | −1.36e−06 | −8.18e−08 |
| C28 | $Y^6$ | 3.42e−05 | 1.25e−06 | −1.31e−07 |

TABLE 3

Coefficients in a surface shape equation for an aspheric surface

| | Parameter item | Surface 103 |
|---|---|---|
| | K | 8.62 |
| C1 | $R^4$ | −3.27e−05 |
| C2 | $R^6$ | 7.22e−08 |
| C3 | $R^8$ | 5.62e−10 |
| C4 | $R^{10}$ | −4.27e−12 |
| C5 | $R^{12}$ | 1.36e−14 |
| C6 | $R^{14}$ | −2.46e−17 |
| C7 | $R^{16}$ | 2.63e−20 |
| C8 | $R^{18}$ | −1.55e−23 |
| C9 | $R^{20}$ | 3.94e−27 |

The surface shape of the free-form surface may be described in a form of an XY polynomial. The equation is as follows:

$$z = \frac{c(x^2 + y^2)}{1 + \sqrt{1 - (1+k)c^2(x^2 + y^2)}} + \sum_{j=2}^{28} C_j x_m y_n$$

The equation for the aspheric surface is as follows:

$$z = \frac{cr2}{1 + \sqrt{1 - (1+k)c^2 r^2}} + \sum_{j=2}^{10} C_j r^n$$

Auxiliary Lens

Figure 2A:
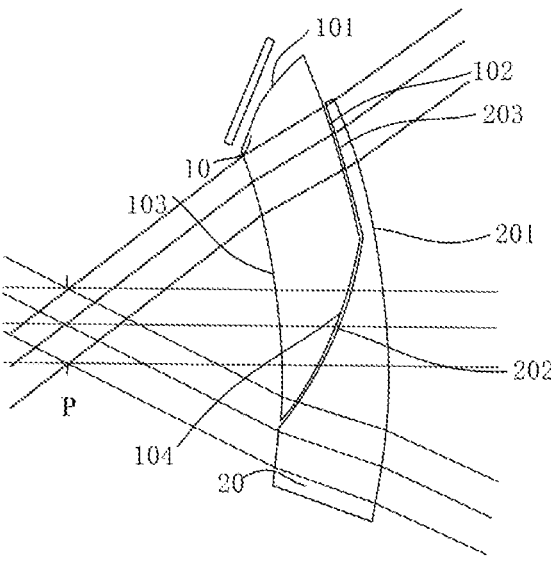
FIG. 2A shows a first cross-sectional view of a combination manner of a primary lens and an auxiliary lens according to the present disclosure.
Figure 2B:
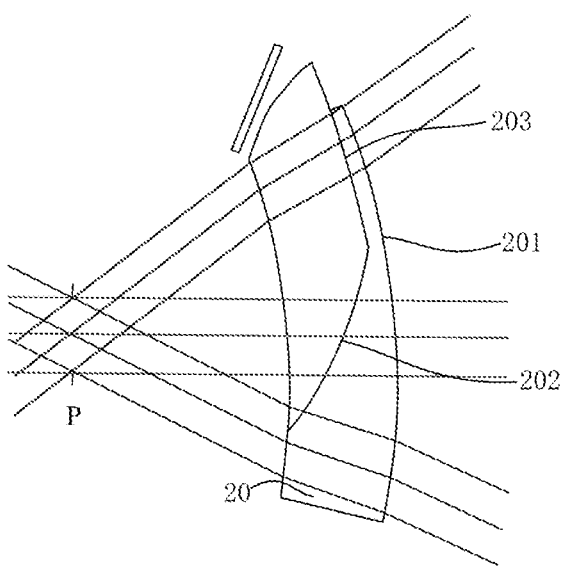
FIG. 2B shows a second cross-sectional view of a combination manner of a primary lens and an auxiliary lens according to the present disclosure.

FIG. 2A and FIG. 2B respectively show combination manners of an auxiliary lens and a primary lens in an optical lens group used for AR display according to the present disclosure. FIG. 2A shows a preferred manner of the auxiliary lens.

Specifically, that a human eye is located in the front is used as an example to describe a structure of the optical lens group used for AR display according to the present disclosure shown in FIG. 2A. The auxiliary lens 20 is adjacent to the primary lens 10 and located on a rear side of the primary lens, and includes at least two effective optical surfaces: a first optical surface 201 and a second optical surface 202 of the auxiliary lens. The first optical surface 201 faces the real-world side, and has a surface shape similar to that of the third optical surface 103 of the primary lens. The second optical surface 202 faces the human eye, has the same surface shape as the fourth optical surface 104 of the primary lens, and can be fixed with the fourth optical surface by gluing. The auxiliary lens 20 further has a third optical surface 203, arranged to extend upward from a vertex position of the existing surface shape of the second optical surface 202 of the auxiliary lens, and a part thereof adjacent to the second optical surface 102 of the primary lens has the same surface shape as the second optical surface 102, so that the auxiliary lens extends toward the direction of the second optical surface until it partially covers the second optical surface. In this way, the optical lens group used for AR display including the primary lens 10 and the auxiliary lens 20 maintains a generally consistent direction on a side facing the exit pupil position P from the surface 103 of the primary lens and an outer surface of the auxiliary lens. On the real-world side, the surface 201 of the auxiliary lens constitutes an overall consistent direction. The auxiliary lens 20 and the primary lens 10 are made of the same material to avoid as much as possible light refraction caused by each lens to external real-world light. In this way, ultimately, when entering the eye box through the auxiliary lens 20 and the primary lens 10, parallel light entering the system from the natural environment still maintains or approximately maintains a direction, an aperture, and parallelism before incidence.

Figure 4:
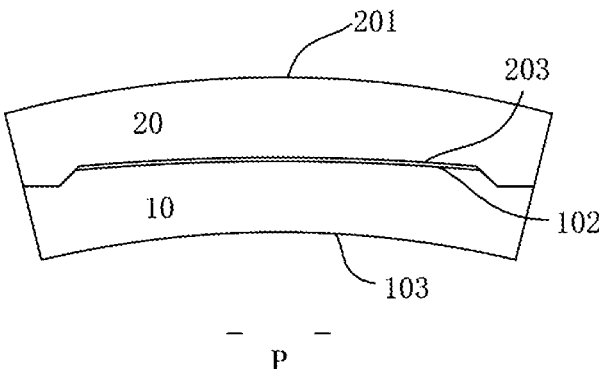
FIG. 4 is a cross-sectional view along another direction of the lens group according to the present disclosure to illustrate a gap.

In addition, preferably, in the optical lens group for AR display of the present disclosure shown in FIG. 2A, the second optical surface 102 of the primary lens is arranged as a total reflection surface, that is, when the image light is incident onto the second optical surface 102 of the primary lens, an incident angle thereof is greater than a critical angle of total reflection of the material used by the primary lens 10, so that when the image light reaches the second optical surface 102 of the primary lens, a total reflection condition is met. In this case, there needs to be an air gap between the second optical surface 102 of the primary lens and the third optical surface 203 of the auxiliary lens. A thickness of the air gap is preferably 0.1 mm. Optionally, an air gap of the same thickness is also provided between the second optical surface 202 of the auxiliary lens and the fourth optical surface 104 of the primary lens. For example, the air gap may be implemented by arranging protrusions and grooves positioned around the circumference of the primary lens and the auxiliary lens. A part in which a height of a protrusion is greater than a depth of a groove can constitute the air gap. Alternatively, as shown in FIG. 4, the second optical surface 102 of the primary lens and the third optical surface 203 of the auxiliary lens adjacent thereto extend to construct a discontinuous auxiliary surface. The auxiliary surface and the surface 102/203 are implemented by forming a step. The air gap between the second optical surface 102 and the third optical surface 203 is constructed through the shape of the auxiliary surface. However, not limited to the manner of FIG. 2A, the second optical surface 102 may alternatively not meet the total reflection condition, as shown in FIG. 2B. In this case, the second optical surface 102 includes a spectroscopic film with a predetermined transmission-reflection ratio, so that the image light is partially reflected when it reaches the second optical surface. The primary lens and the auxiliary lens are fixed together by gluing.

In the manner of the auxiliary lens shown in FIG. 2A and FIG. 2B, the shape of the optical lens group for AR display of the present disclosure may be largely determined by the auxiliary lens. In this case, a length of a linear distance from a vertex of the auxiliary lens to its bottom point exceeds 25 mm, so that the field of view of the real-world light received through the lens group with respect to a human eye at the exit pupil position is determined only by a distance from the uppermost to the lowermost edge of the auxiliary lens.

Figure 3:
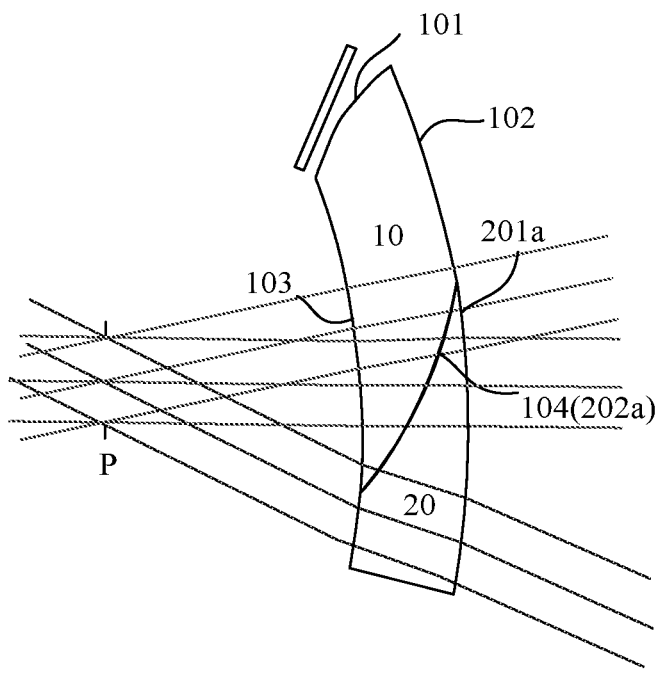
FIG. 3 is another form of cross-sectional view of the primary lens and the auxiliary lens according to the present disclosure.

Alternatively, not limited to the auxiliary lens forms shown in FIG. 2A and FIG. 2B, FIG. 3 can also be used as another auxiliary lens form of the optical lens group for AR display of the present disclosure, and includes only a portion extending downward from the fourth optical surface of the primary lens 10. Specifically, that a human eye is located in the front is used as an example to describe a structure of the optical lens group. The auxiliary lens 20 is adjacent to the primary lens 10 and located on a rear side of the primary lens, and includes at least two effective optical surfaces: a first optical surface 201a and a second optical surface 202a of the auxiliary lens. The first optical surface 201a faces a natural environment side, has a surface shape similar to that of the second optical surface 102 of the primary lens, and is in a state of continuing the second optical surface 102. The second optical surface 202a of the auxiliary lens and the fourth optical surface 104 of the primary lens have the same surface shape and are combined by gluing. Similarly, the auxiliary lens 20 and the primary lens 10 shown in FIG. 3 are made of the same material to avoid as much as possible light refraction caused by each lens to external real-world light. In this way, ultimately, when entering the eye box through the auxiliary lens 20 and the primary lens 10, parallel light entering the system from the natural environment still maintains or approximately maintains a direction, an aperture, and parallelism before incidence.

In the optical lens group for AR display shown in FIG. 2A, FIG. 2B, and FIG. 3 according to the present disclosure, because the first optical surface (201, 201a) of the auxiliary lens does not affect an optical path of the image light toward the exit pupil position P, its surface shape may be adjusted in a customized manner, so that the real-world light passing through the lens system as parallel light converges or diverges to a particular extent at a particular angle when it enters the human eye, thereby achieving vision correction when the human eye observes the real environment. In addition, the position of the micro-display panel 30 relative to the first optical surface of the primary lens can be changed, and the virtual image distance of the micro-display panel can also be changed, thereby achieving vision correction for the human eye observing a virtual scene, to adapt to commonly used frames for vision correction and the consideration of facial features of humans.

Near-Eye Display Structure

Figure 5:
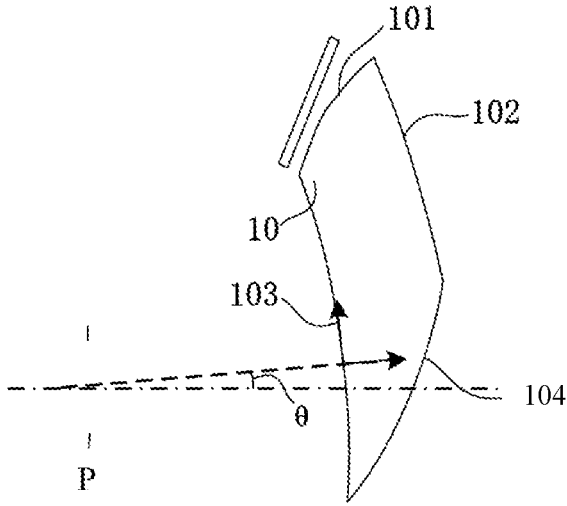
FIG. 5 is a schematic diagram of a tilt angle of the primary lens according to the present disclosure.
Figure 6:
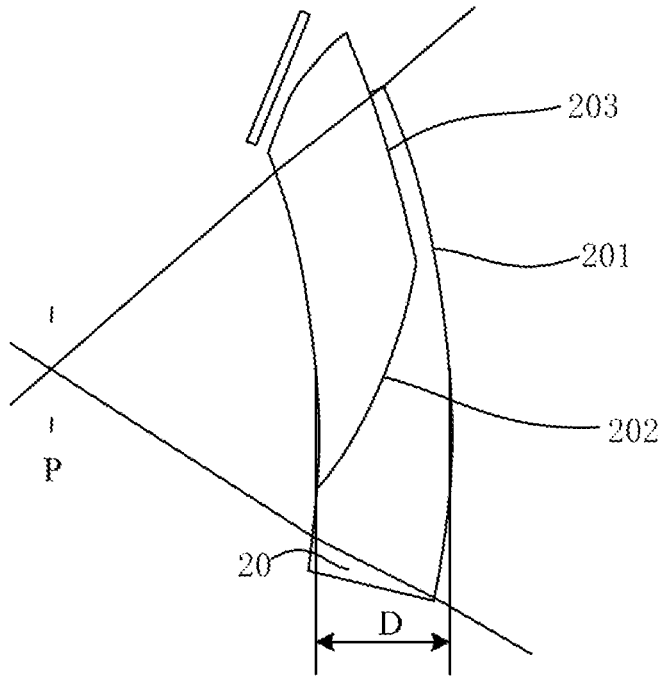
FIG. 6 is a schematic diagram of a field of view of real-world light and a thickness along a visual axis of the lens group according to the present disclosure.

According to another aspect of the present disclosure, because the virtual imaging device formed by the lens group in the foregoing embodiment can be used as an optical element of the near-eye display, with thinness and lightness, the near-eye display of the present disclosure is made to have an appearance similar to that of ordinary corrective glasses or fashionable sunglasses. The near-eye display includes a virtual imaging device including the lenses of the embodiments of the present disclosure and a micro-display panel of a predetermined size. The micro-display panel of the lens group of the present disclosure is placed above the first optical surface of the primary lens, and needs a necessary fixation structure to be fixed to the primary lens. As shown in FIG. 5, a normal at an origin position of the optical surface 103 of the primary lens 10 facing the exit pupil position has a tilt angle θ with respect to a normal of an exit pupil plane. The tilt angle θ satisfies $0° < θ < 10°$, to adapt to a visual range of a user that is defined by transmitted edge light in a vertical direction to the real-world light as shown in FIG. 6. Preferably, a perspective field of view in the vertical direction has a range of greater than −25° to +20°, and has a controllable thickness D on the visual axis, satisfying 8<D<12 mm.

The lenses are preferably provided in a form of binoculars in a body of the eyeglasses. In a scenario in which monocular display is desired, it is only necessary to not mount a monocular micro-display panel. In this case, a weight difference between two sides is small, and a uniform appearance can be achieved without any separate counterweight. Due to the action of a light splitting layer on the fourth and/or second optical surface in the lens group, light from a real-world scene (that is, the real-world light) and image light from the micro-display panel merge at the user eye, thus allowing the user to see an image merging image light information and real-world light information. The shape of the optical lens group for AR display in the present disclosure is preferably a flat shape with an arc-shaped outer surface, and can finally be cut into a circle, an ellipse, or other shapes centered on the visual axis. However, without being limited thereto, those skilled in the art may understand that the final shape of the thin and light lens can be determined by a frame of the glasses.

Generally, the thinness and lightness allow the user to wear the near-eye display device in the form of eyeglasses of the present disclosure comfortably and for a relatively long time, both indoors and outdoors, without the need for additional corrective glasses. In addition to the lens group part, an additional sensor may be further built into the frame of the eyeglasses to obtain various information, to determine what type of AR image is appropriate and where it should be provided on the overall image, such as environment construction with depth cameras, inertial measurement units, and motion tracking technologies. Various corresponding sensors and controllers in some implementations all can constitute various data obtained and required for sensing the foregoing near-eye display of the present disclosure. The controller may be a general-purpose data processing and control device, such as a central processing unit (CPU) or other microprocessors. Those skilled in the art should understand that, the sensors and their accompanying circuits, as well as a main board on which a CPU is usually mounted, and the like are usually placed in leg of eyeglasses, which increases the weight of the device in the form of eyeglasses. Therefore, the device should be as small as possible to minimize the effect of reducing the comfort of wearing the eyeglasses. From the perspective of fashion, the thinness and lightness allow the device in the form of eyeglasses of the present disclosure to be also suitable for wearing in various decorative occasions. For example, when a protective effect like sunglasses is desired, a filter film may be coated on an outer side of the secondary lens to filter excessive sunlight or some harmful light, which is easy to implement.

The foregoing detailed description of the present technology is presented for purposes of illustration and description only. It is not intended to be exhaustive explanation or to limit the present technology to the precise form disclosed. Many modifications and variations are possible in light of the above teachings. The described embodiments are only intended to best illustrate the principles of the present technology and its practical application, thereby enabling others skilled in the art to best utilize the present technology in various embodiments. Various modifications suitable for particular uses are also possible. The scope of the present technology is defined by the appended claims.

What is claimed is:

1. An optical lens group for augmented reality (AR) near-eye display, comprising a primary lens and an auxiliary lens, the auxiliary lens being adjacent to at least one surface of the primary lens, wherein the primary lens comprises a first optical surface configured to receive image light that is subject to at least one total reflection, and one reflection depending on a transmission-reflection split ratio in the primary lens after entering the primary lens through the first optical surface, and then is transmitted out of the primary lens and reaches an exit pupil position, a tilt angle θ of a normal line at a vertex position of an optical surface of the primary lens facing the exit pupil position with respect to a normal line of an exit pupil plane satisfies 0°<θ<10°, and a field of view of the image light received by the lens group with respect to a user eye at the exit pupil position is determined solely by the primary lens;

the auxiliary lens is disposed at least adjacent to an optical surface of the primary lens distal from the first optical surface; and a surface of the auxiliary lens facing an environment side extends from a surface of the primary lens distal from the first optical surface to be in continuity with a second optical surface of the primary lens, or extends from a surface of the primary lens distal from the first optical surface to a direction of a second optical surface of the primary lens to partially cover the second optical surface.

2. The optical lens group according to claim 1, wherein the primary lens comprises at least four effective optical surfaces: a first optical surface, a second optical surface, a third optical surface, and a fourth optical surface, wherein the image light received by the first optical surface enters the primary lens and propagates to the direction of the second optical surface, undergoes a first light reflection on the second optical surface and propagates to a direction of the third optical surface, undergoes total reflection after reaching the third optical surface and then propagates to a direction of the fourth optical surface, undergoes a second reflection after reaching the fourth optical surface and propagates towards the third optical surface, and finally reaches the exit pupil position of the primary lens after exiting from the third optical surface.

3. The optical lens group according to claim 2, wherein the second optical surface and the third optical surface of the primary lens are disposed on different sides; and the fourth optical surface is an optical surface away from the first optical surface and is used for connecting the second optical surface and the third optical surface, and each optical surface of the primary lens is constructed to satisfy a total reflection condition when the image light first reaches the third optical surface.

4. The optical lens group according to claim 3, wherein the second optical surface and/or the fourth optical surface are free-form surface, and the third optical surface is spherical or aspheric.

5. The optical lens group according to claim 2, wherein the primary lens is constructed to satisfy a condition that the reflection of the image light by the second optical surface is total reflection when the image light reaches the second optical surface; and the auxiliary lens is constructed in such a manner that the auxiliary lens extends from adjacent to a position connecting the second optical surface and the fourth optical surface to the direction of the second optical surface until the auxiliary lens partially covers the second optical surface, there is an air gap between the auxiliary lens and the second optical surface, a length of a linear distance from the top of the auxiliary lens to the bottom of the auxiliary lens exceeds 25 mm, and only an uppermost edge to a lowermost edge of the auxiliary lens determines a field of view of real-world light received through the lens group with respect to the human eye at the exit pupil position.

6. The optical lens group according to claim 5, wherein the air gap is formed by constructing the second optical surface of the primary lens and a surface adjacent to the second optical surface of the auxiliary lens into discontinuous extended surfaces to form steps.

7. The optical lens group according to claim 1, wherein materials of the primary lens and the auxiliary lens are selected from any one of optical glass materials, optical resin materials, or other optical materials; and the primary lens and the auxiliary lens are made of the same optical material.

8. A virtual imaging device using the optical lens group for augmented reality (AR) near-eye display according to claim 1, wherein the virtual imaging device further comprises a micro-display panel as an image source, and the micro-display panel is fixed near the first optical surface by a frame.

9. The virtual imaging device according to claim 8, wherein the micro-display panel is selected from a micro OLED, a micro-LED, an LCoS, a micro LCD, or a DLP type.

10. The virtual imaging device according to claim 9, wherein the optical lens group fixed by the frame has a total thickness of less than 12 mm on a visual axis along a center of an exit pupil, and reaches a field of view of not less than 36°.

11. The virtual imaging device according to claim 10, wherein an optical surface of the optical lens group facing the exit pupil and an optical surface of the optical lens group facing the environment side have a same surface shape, or have different surface shape to reach a user's given diopter.

12. A near-eye display, wherein the near-eye display is in a form of eyeglasses, comprising the virtual imaging device according to claim 9 placed in a lens position of the eyeglasses, and a main board and a battery placed in legs of the eyeglasses.

* * * * *